(12) United States Patent
Chen et al.

(10) Patent No.: US 12,139,440 B1
(45) Date of Patent: Nov. 12, 2024

(54) SELF-HEALING CERAMIC MATERIAL WITH REDUCED POROSITY AND METHOD FOR PREPARING THE SAME

(71) Applicant: QILU UNIVERSITY OF TECHNOLOGY (SHANDONG ACADEMY OF SCIENCES), Shandong (CN)

(72) Inventors: Zhaoqiang Chen, Jinan (CN); Yuxin Shi, Jinan (CN); Chonghai Xu, Jinan (CN); Hui Chen, Jinan (CN); Mingdong Yi, Jinan (CN); Guangchun Xiao, Jinan (CN); Jingjie Zhang, Jinan (CN); Wenjun Liu, Jinan (CN)

(73) Assignee: QILU UNIVERSITY OF TECHNOLOGY (SHANDONG ACADEMY OF SCIENCES), Shandong (CN)

( * ) Notice: Subject to any disclaimer, the term of this patent is extended or adjusted under 35 U.S.C. 154(b) by 0 days.

(21) Appl. No.: 18/741,901

(22) Filed: Jun. 13, 2024

(30) Foreign Application Priority Data

Jun. 29, 2023 (CN) .......................... 202310786466.8

(51) Int. Cl.
*C04B 35/64* (2006.01)
*C04B 35/101* (2006.01)
*C04B 35/626* (2006.01)

(52) U.S. Cl.
CPC ...... *C04B 35/1015* (2013.01); *C04B 35/6261* (2013.01); *C04B 35/62655* (2013.01); *C04B 35/64* (2013.01); *C04B 2235/3206* (2013.01); *C04B 2235/3217* (2013.01); *C04B 2235/3225* (2013.01); *C04B 2235/3886* (2013.01);
(Continued)

(58) Field of Classification Search
CPC ............ C04B 35/1015; C04B 35/6261; C04B 35/62655; C04B 35/64; C04B 2235/3206; C04B 2235/3217; C04B 2235/3225; C04B 2235/3886; C04B 2235/3891; C04B 2235/5436; C04B 2235/5445; C04B 2235/6562; C04B 2235/6567; C04B 2235/666
See application file for complete search history.

(56) References Cited

U.S. PATENT DOCUMENTS

2020/0101452 A1* 4/2020 Huang ..................... D06N 7/00

* cited by examiner

*Primary Examiner* — James A Fiorito
*Assistant Examiner* — Cameron K Miller
(74) *Attorney, Agent, or Firm* — IPRO, PLLC; Na Xu

(57) ABSTRACT

The present invention provides a self-healing ceramic material with reduced porosity and a method for preparing the same. The self-healing ceramic material comprises the following components by volume: 60-85 parts by volume of $Al_2O_3$, 10-20 parts by volume of TiN, 10-20 parts by volume of $TiSi_2$, 0.1-1 parts by volume of MgO, and 0.1-1 parts by volume of $Y_2O_3$. Wherein, $Al_2O_3$ serves as a matrix, TiN and $TiSi_2$ act as repair agents, and MgO and $Y_2O_3$ function as sintering aids. The repair function is realized by adding TiN and $TiSi_2$, which have repair capabilities, to the ceramic matrix, enabling the ceramic material to heal cracks. TiN plays the main role of repair function, and $TiSi_2$ assists in the repair and helps reduce the formation of surface pores.

10 Claims, 6 Drawing Sheets

(52) U.S. Cl.
CPC .............. *C04B 2235/3891* (2013.01); *C04B 2235/5436* (2013.01); *C04B 2235/5445* (2013.01); *C04B 2235/6562* (2013.01); *C04B 2235/6567* (2013.01); *C04B 2235/666* (2013.01)

SELF-HEALING CERAMIC MATERIAL WITH REDUCED POROSITY AND METHOD FOR PREPARING THE SAME

CROSS-REFERENCE TO RELATED APPLICATIONS

The present invention claims priority to Chinese Patent Application No. 202310786466.8, filed on 29 Jun. 2023 with the China National Intellectual Property Administration, entitled 'self-healing ceramic material with reduced porosity and method for preparing the same'. The entire content of this application is incorporated herein by reference and constitutes a part of the present invention for all purposes.

BACKGROUND OF THE INVENTION

The statements herein provide only the background technology related to the present invention and do not necessarily constitute prior art.

Ceramic materials are widely used in modern industry due to their high hardness, excellent wear resistance, and chemical stability, which contribute to their long service life. However, their high brittleness makes them sensitive to micro-defects. During the preparation and mechanical processing of ceramic materials, defects such as micro-cracks can occur, which reduces the performance and reliability of the material.

The repair function of self-healing ceramic materials refers to the action of repairing cracks by the repair phase of the ceramic material under appropriate heat treatment temperatures.

Utilizing the self-healing function of ceramic materials can eliminate cracks on the surface of ceramics, which is beneficial for enhancing the reliability of the materials. However, using materials such as TiN and SiC as repair phases can generate gases, leading to the formation of pores on the repaired surfaces.

SUMMARY OF THE INVENTION

In view of the deficiencies in the prior art, the objective of the present invention is to provide a self-healing ceramic material with reduced porosity and a method for preparing the same.

To achieve the aforementioned objectives, the present invention is implemented through the following technical solutions:

first aspect, the present invention provides a self-healing ceramic material with reduced porosity, comprising the following components by volume: 60-85 parts by volume of $Al_2O_3$, 10-20 parts by volume of TiN, 10-20 parts by volume of $TiSi_2$, 0.1-1 parts by volume of MgO, and 0.1-1 parts by volume of $Y_2O_3$.

In this composition, $Al_2O_3$ serves as a matrix, TiN and $TiSi_2$ act as repair agents, and MgO and $Y_2O_3$ function as sintering aids. The repair function is realized by adding TiN and $TiSi_2$, which have repair capabilities, to the ceramic matrix, enabling the material to heal cracks. TiN plays the main role of repair function, and $TiSi_2$ assists in the repair and helps reduce the formation of surface pores.

In some embodiments, the self-healing ceramic material with reduced porosity comprises the following components by volume: 65-70 parts by volume of $Al_2O_3$, 15-20 parts by volume of TiN, 13-18 parts by volume of $TiSi_2$, 0.3-0.8 parts by volume of MgO, and 0.3-0.8 parts by volume of $Y_2O_3$.

Preferably, the self-healing ceramic material with reduced porosity comprises the following components by volume: 67-68 parts by volume of $Al_2O_3$, 16-17 parts by volume of TiN, 14-16 parts by volume of $TiSi_2$, 0.4-0.6 parts by volume of MgO, and 0.4-0.6 parts by volume of $Y_2O_3$.

More preferably, the self-healing ceramic material with reduced porosity comprises the following components by volume: 67.2 parts by volume of $Al_2O_3$, 16.8 parts by volume of TiN, 15 parts by volume of $TiSi_2$, 0.5 parts by volume of MgO, and 0.5 parts by volume of $Y_2O_3$.

In some embodiments, an average particle size of $Al_2O_3$ powder is 0.5-1 μm, an average particle size of TiN powder is 0.5-1 μm, an average particle size of $Y_2O_3$ powder is 1-3 μm, and an average particle size of MgO powder is 0.4-0.7 μm.

Second aspect, the present invention provides a method for preparing a self-healing ceramic material with reduced porosity, comprising the following steps:

proportionally measuring $Al_2O_3$, TiN, and $TiSi_2$ powders and adding anhydrous ethanol and a dispersant to each component, ultrasonically dispersing the components to prepare individual suspensions of $Al_2O_3$, TiN, and $TiSi_2$, mixing the three suspensions to form a composite phase suspension; and proportionally adding MgO and $Y_2O_3$ powders to the composite phase suspension, ultrasonically dispersing, then ball milling in an inert atmosphere, followed by drying, sieving, pre-pressing, and sintering in a spark plasma sintering furnace.

Polyethylene glycol 6000 has a good dispersing effect, which can effectively prevent material from settling and aggregation, reduce the time needed for dispersion, and improve efficiency.

After obtaining the composite phase suspension, MgO powder and $Y_2O_3$ powder are added as sintering aids to ensure their uniform distribution among the various ceramic phases.

There are two main reasons for not adding the sintering aids to the $Al_2O_3$ suspension, TiN suspension and $TiSi_2$ suspension individually and proportionally. Firstly, the sintering aids are small in content, and weighing them out separately by proportion can lead to significant errors. Secondly, the sintering aids are easily dispersed, and adding them to the composite phase suspension will also result in good dispersion and save time, thereby enhancing efficiency.

Ball milling in an inert atmosphere is conducted to prevent the oxidation of TiN and $TiSi_2$.

In some embodiments, the dispersant is polyethylene glycol 6000.

In some embodiments, the ball milling is conducted for 40-50 hours.

In some embodiments, the sintering uses the following heating program: maintaining a heating rate of 100° C./min when a temperature of sintering is below 800° C.; controlling the heating rate to 80° C./min when the temperature of sintering is 800-1200° C.; and reducing the heating rate to 50° C./min when the temperature of sintering is 1200-1400° C.; with an axial pressure of 30 MPa during the sintering, and holding for 6 minutes after the temperature reaches 1400° C.

In some embodiments, the sieving is performed using a 200 mesh screen.

The beneficial effects obtained from one or more embodiments of the present invention are as follows:

$TiSi_2$ serves as a sintering aid for ceramic materials, reducing grain boundary porosity and decreasing the internal porosity of the materials. $TiSi_2$ also serves as a conductive phase, and its addition promotes the discharge plasma sintering of $Al_2O_3$, reducing the sintering temperature and saving energy. The prepared ceramic materials possess good sintering density, enhancing the overall mechanical properties of the ceramic materials.

By adding $TiSi_2$ to $Al_2O_3$/TiN ceramic materials to reduce porosity, the selected repair agents, TiN and $TiSi_2$, react with oxygen at 600° C. to form $TiO_2$ and $SiO_2$, which can repair cracks effectively in the ceramic materials.

The mechanism by which $TiSi_2$ reduces porosity of the repair surface involves the following: at higher heat treatment temperatures, TiN oxidizes extensively, filling the cracks, but excessive oxidation of TiN on the surface generates a large amount of gas, leading to porosity. $TiSi_2$ can form an oxide layer on the material surface, which prevents the TiN on the surface from contacting oxygen, thus reducing the oxidation effect of TiN on the surface. The surfaces of the cracks make contact with $O_2$ through the fractures, and the cracks are repaired by the oxidation of TiN and $TiSi_2$ in a high-temperature environment.

The process of the method of the present invention is concise and highly practical.

BRIEF DESCRIPTION OF DRAWINGS

The accompanying drawings to the specification, which form part of the present invention, are used to provide a further understanding of the present invention, and the illustrative examples of the present invention and the description thereof are used to explain the present invention and are not unduly limiting the present invention.

DETAILED DESCRIPTION OF THE INVENTION

Figure 1:
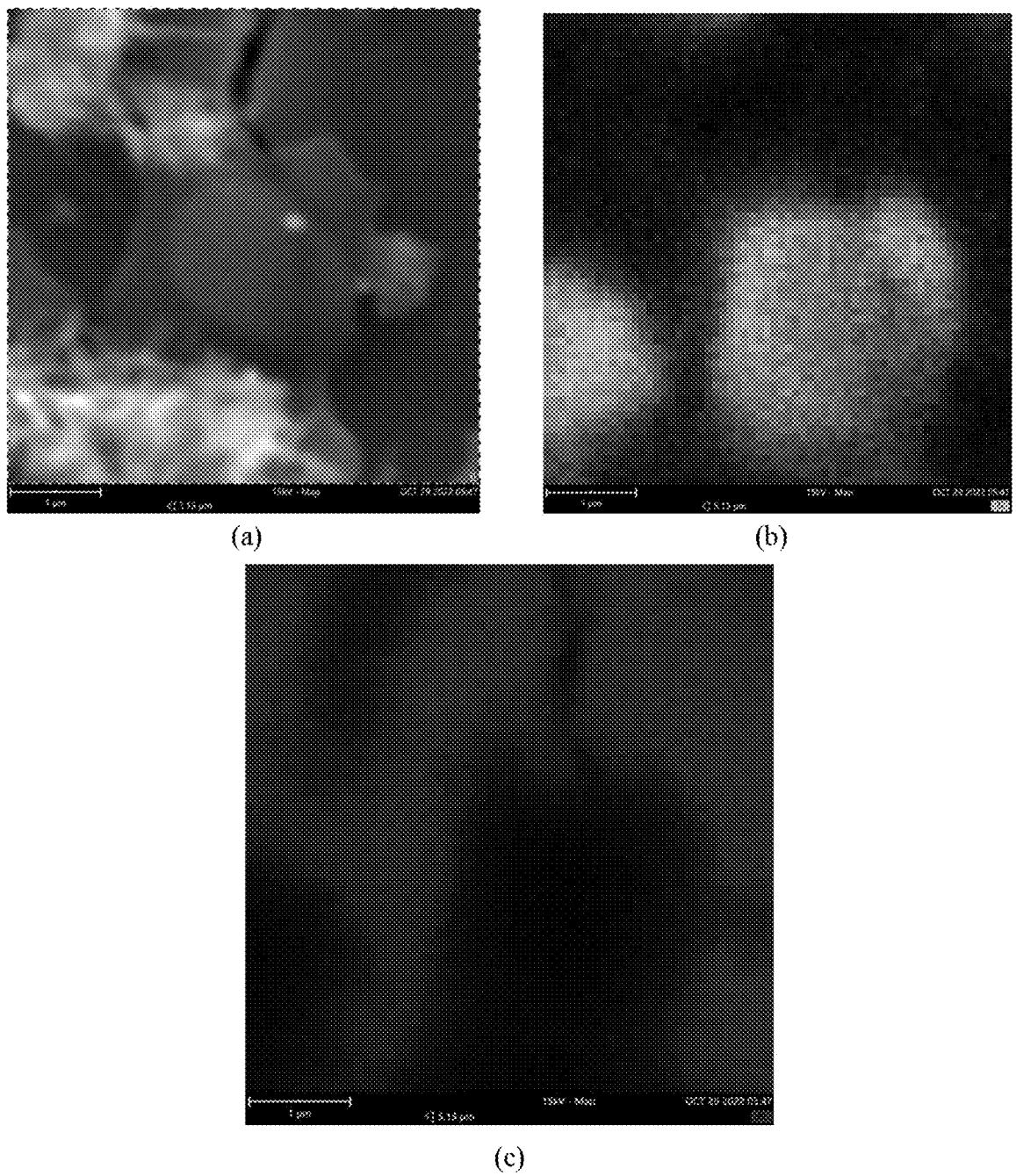
FIG. 1: (a) SEM image of the oxide layer observed on the repaired surface in Example 2; (b) elemental analysis of the repaired surface for silicon; (c) elemental analysis of the repaired surface for aluminum.

It should be noted that the following detailed descriptions are all illustrative and intended to provide further clarification of the present invention. Unless otherwise specified, all technical and scientific terms used in the present invention have the same meaning as commonly understood by those of ordinary skill in the art to which the present invention belongs.

The present invention will be further described below in conjunction with the following examples.

Example 1

A self-healing ceramic material, consisting of 67.20 vol % $Al_2O_3$, 16.80 vol % TiN, 15 vol % $TiSi_2$, 0.5 vol % MgO, and 0.5 vol % $Y_2O_3$.

A method for preparing the self-healing ceramic material, including the following steps:
S1: Considering the density of the materials, $Al_2O_3$, TiN, and $TiSi_2$ powders were proportionally weighed, and an appropriate amount of anhydrous ethanol and polyethylene glycol 6000 were added to each ceramic material component, followed by ultrasonic stirring for 30 minutes. $Al_2O_3$ suspension, TiN suspension, and $TiSi_2$ suspension were prepared.
S2: The aforementioned three suspensions were mixed to obtain a composite phase suspension; then, MgO and $Y_2O_3$ powders were added proportionally, ultrasonically dispersed, and mechanically stirred for 30 minutes.
S3: After the ultrasonication, the obtained mixed liquid was placed into a ball mill jar, and alumina corundum balls weighing five times the mass of the powder were added, along with nitrogen as a protective gas.
S4: The ball mill jar was placed in a jar mill and ball milled for 48 hours. The ball-milled ceramic material was then placed in a vacuum drying oven for drying. The powder obtained after drying was sieved through a 200 mesh sieve. The sieved powder was placed into a graphite mold and pre-pressed.
S5: The material was sintered in a spark plasma sintering (SPS) furnace. The sintering process of the self-healing ceramic material was adjusted in three stages of heating rates: the heating rate was set at 100° C./min until reaching 800° C.; from 800° C. to 1200° C., the heating rate was adjusted to 80° C./min; and from 1200° C. to 1250° C., the heating rate was further reduced to 50° C./min; with an axial pressure of 30 MPa during the sintering process, and holding for 6 minutes after the temperature reaches 1400° C.

The ceramic material prepared in this example was cut into standard bar samples measuring 3 mm×4 mm×35 mm, which were then rough ground, fine ground, chamfered, and polished. The mechanical properties were tested, and the results showed that the material had a flexural strength of 685.19 MPa, a hardness of 9.28 GPa and a fracture toughness of 1.75 MPa·m1/2. The performance was relatively good.

Example 2

The composition and sintering process of the self-healing ceramic material were the same as in Example 1, with the following differences:
the sintering process of the self-healing ceramic material was adjusted in three stages of heating rates: the heating rate was set at 100° C./min until reaching 800° C.; from 800° C. to 1200° C., the heating rate was adjusted to 80° C./min; and from 1200° C. to 1300° C., the heating rate was further reduced to 50° C./min; with an axial pressure of 30 MPa during the sintering process, and holding for 6 minutes after the temperature reaches 1400° C.

The $Al_2O_3$/TiN/$TiSi_2$ ceramic material prepared in this example was cut into standard bar samples measuring 3 mm×4 mm×35 mm, which were then rough ground, fine ground, chamfered, and polished. The mechanical properties were tested, and the results showed that the material had a flexural strength of 719.31 MPa, a hardness of 16.55 GPa and a fracture toughness of 4.73 MPa·m1/2. The overall performance was the best.

Figure 3:
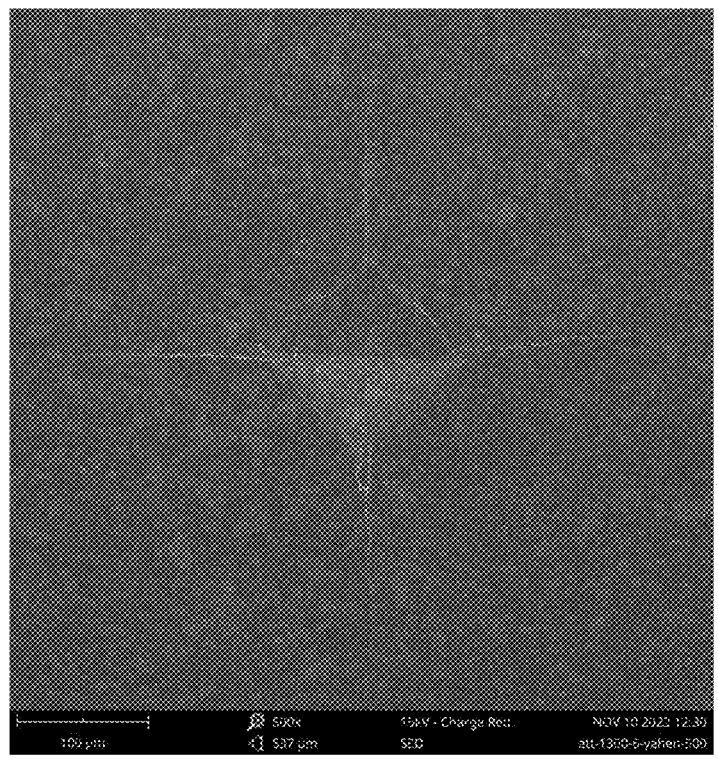
FIG. 3: Morphology of the cracks in the $Al_2O_3$/TiN/$TiSi_2$ ceramic material prepared in Example 2 of the present invention.

Using a Vickers hardness tester, a pre-crack was created on the smooth ceramic surface under a load of 196 N with a dwell time of 15 seconds, as shown in FIG. 3.

Figure 4:
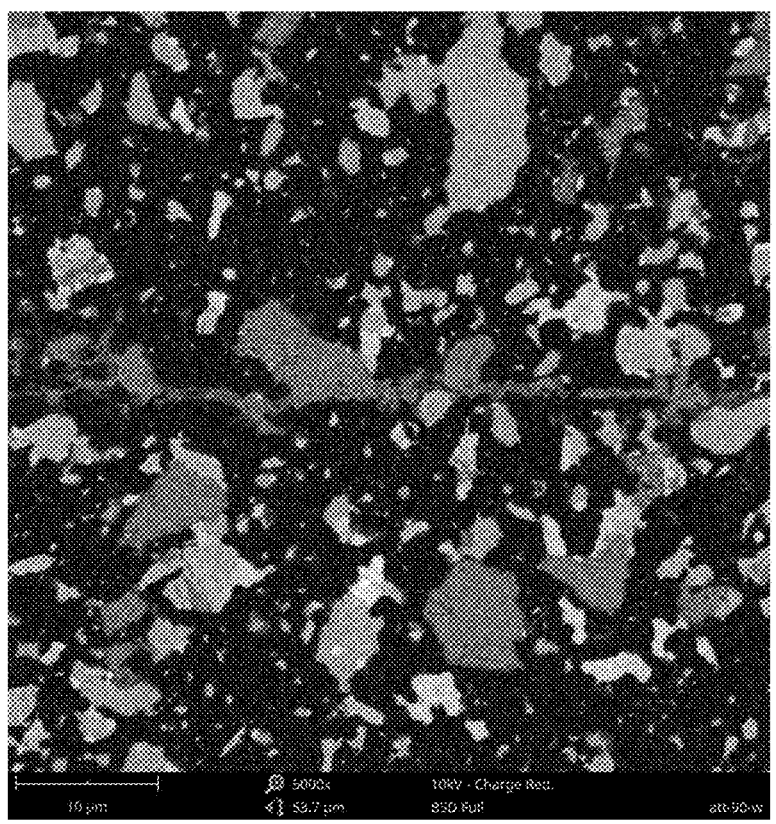
FIG. 4: Morphology of the surface cracks after healing in the $Al_2O_3$/TiN/$TiSi_2$ ceramic material prepared in Example 2 of the present invention.

The cracked samples were subjected to different heat treatments in a high-temperature air furnace. When the heat treatment temperature was 600° C. with a hold time of 60 minutes, the degree of crack repair was low. This was due to the formation of an oxide layer by $TiSi_2$ on the repair surface, which hindered the interaction between the repair phase and $O_2$, reducing the effectiveness of the repair, as shown in FIG. 1. When the heat treatment temperature was 700° C. with a hold time of 60 minutes, the crack repair was more effective. When the heat treatment temperature was 800° C. with a hold time of 60 minutes, the cracks were almost completely repaired, and the surface porosity was low, as shown in FIG. 4.

Figure 5:
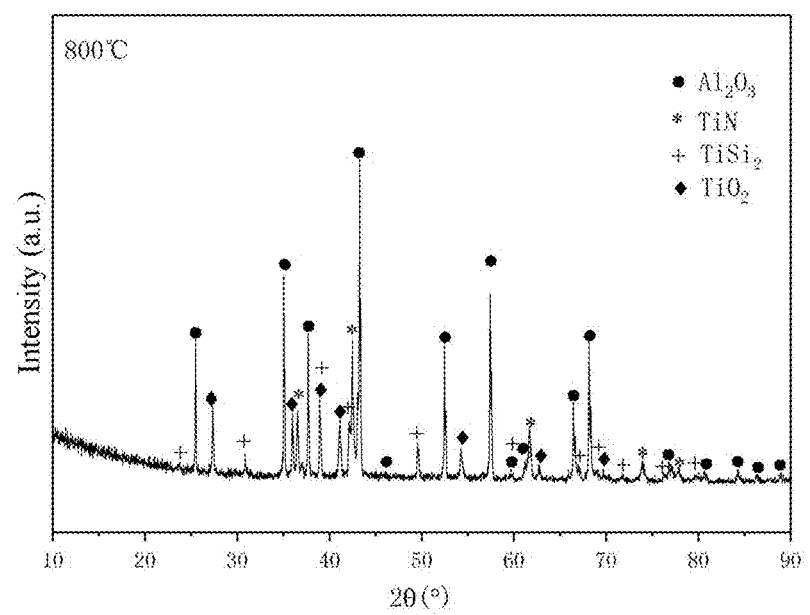
FIG. 5: XRD phase analysis of the repaired surface of the $Al_2O_3$/TiN/$TiSi_2$ ceramic material prepared in Example 2 of the present invention.

XRD phase analysis of the surface of the $Al_2O_3$/TiN/$TiSi_2$ ceramic material was shown in FIG. 5. Observing FIG. 5, distinct peaks of $Al_2O_3$, TiN, $TiSi_2$, and $TiO_2$ were evident, with no other impurity peaks detected, indicating that no impurities were introduced during the preparation and sintering processes, and no reactions occurred between the phases. No peaks of MgO, $Y_2O_3$, and $SiO_2$ were detected, suggesting that the content of these materials was low. The presence of $TiO_2$ indicated the oxidation of TiN to form the repair phase $TiO_2$, which filled the cracks.

Figure 2:
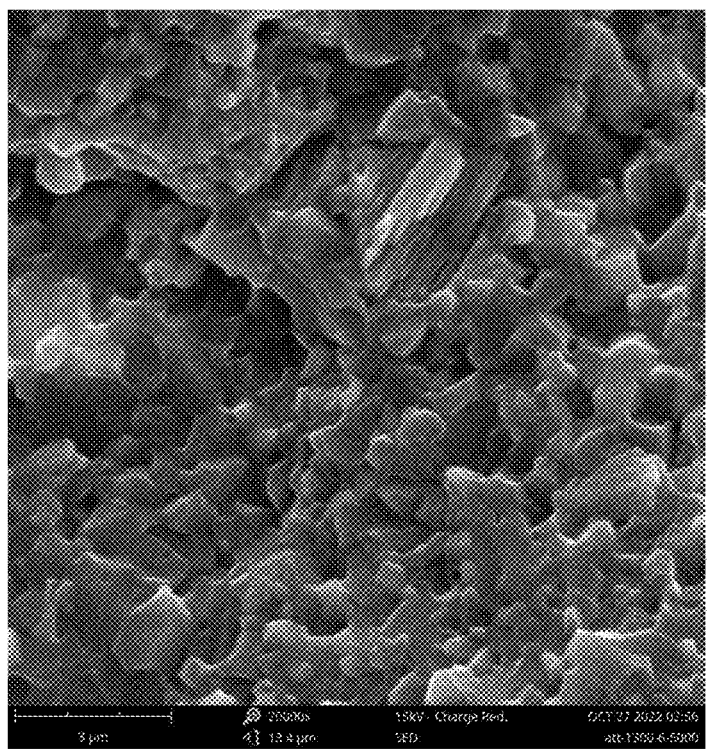
FIG. 2: Cross-sectional SEM image of the $Al_2O_3$/TiN/$TiSi_2$ ceramic material prepared in Example 2 of the present invention.
Figure 6:
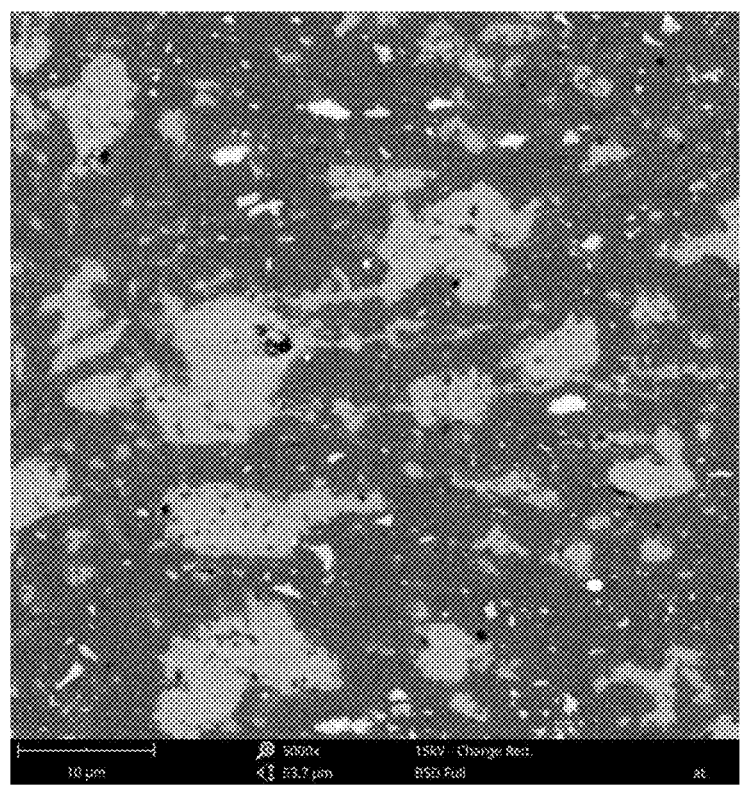
FIG. 6: Morphology of surface cracks after healing in the $Al_2O_3$/TiN ceramic material subjected to heat treatment in Comparative Example 2 of the present invention.
Figure 7:
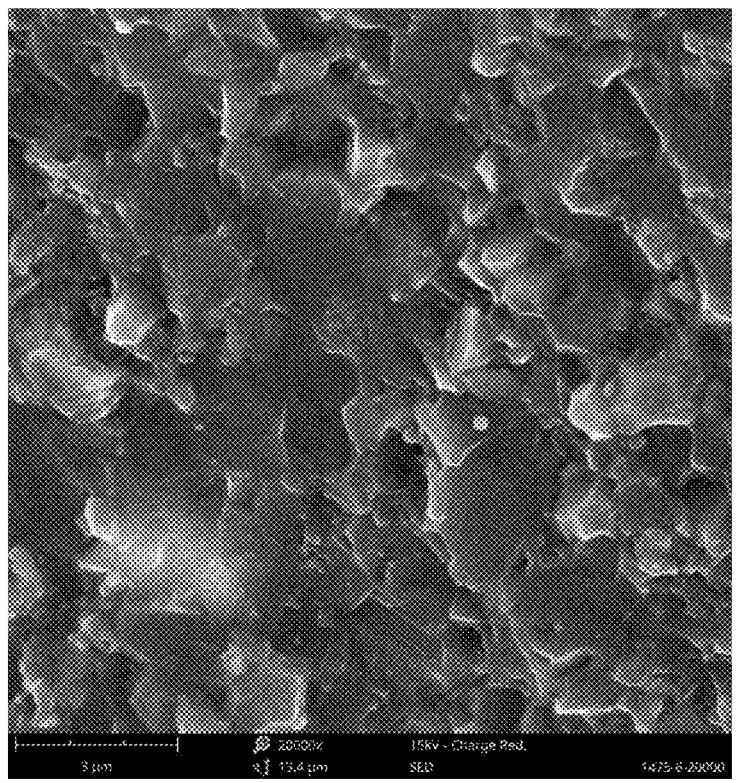
FIG. 7: Cross-sectional SEM image of the $Al_2O_3$/TiN ceramic material prepared in Comparative Example 2 of the present invention.

By observing and comparing FIG. 2 and FIG. 7, it was found that $TiSi_2$ reduced the porosity during the sintering process. Similarly, comparing FIG. 4 and FIG. 6 revealed that $TiSi_2$ reduced the porosity on the repair surface.

Example 3

The composition and sintering process of the self-healing ceramic material were the same as in Example 1, with the following differences:

The sintering process of the self-healing ceramic material was adjusted in three stages of heating rates: the heating rate was set at 100° C./min until reaching 800° C.; from 800° C. to 1200° C., the heating rate was adjusted to 80° C./min; and from 1200° C. to 1350° C., the heating rate was further reduced to 50° C./min; with an axial pressure of 30 MPa during the sintering process, and holding for 6 minutes after the temperature reaches 1400° C. The cross-sectional SEM image of the prepared $Al_2O_3$/TiN/$TiSi_2$ ceramic material was shown in FIG. 2.

The ceramic material prepared in this example was cut into standard bar samples measuring 3 mm×4 mm×35 mm, which were then rough ground, fine ground, chamfered, and polished. The mechanical properties were tested, and the results showed that the material had a flexural strength of 709.70 MPa, a hardness of 15.74 GPa and a fracture toughness of 4.34 MPa·m1/2.

In Comparative Examples 1-3, the composition of the self-healing ceramic material consisted of $Al_2O_3$ as the matrix, TiN as the repair agent, and MgO and $Y_2O_3$ as sintering aids. The volume percentages of each component were 79.20 vol % for $Al_2O_3$, 19.80 vol % for TiN, 0.5 vol % for MgO, and 0.5 vol % for $Y_2O_3$.

The average particle sizes of $Al_2O_3$ and TiN powders were 0.5-1 μm, the average particle size of $Y_2O_3$ powder was 1-3 μm, and the average particle size of MgO powder was 0.5 μm.

$Al_2O_3$ and TiN powders were weighed proportionally, and each component of the ceramic materials was mixed with an appropriate amount of anhydrous ethanol and polyethylene glycol dispersant, followed by ultrasonic stirring for 30 minutes. $Al_2O_3$ suspension and TiN suspension were prepared.

The aforementioned suspensions were mixed to obtain a composite phase suspension. MgO and $Y_2O_3$ powders were then added proportionally, followed by ultrasonic dispersion and mechanical stirring for 30 minutes. After ultrasonication, the mixture was transferred into a ball mill jar, and alumina corundum balls weighing five times the mass of the powder were added, along with nitrogen as a protective gas. The ball mill jar was placed in a jar mill and ball milled for 48 hours.

Afterwards, the ball-milled ceramic material was placed in a vacuum drying oven and dried for 24 hours. The powder obtained after drying was sieved through a 200 mesh sieve. The sieved powder was placed into a graphite mold and pre-pressed. The material was sintered in a spark plasma sintering (SPS) furnace.

Comparative Example 1

The sintering process of the self-healing ceramic material was adjusted in three stages of heating rates: the heating rate was set at 100° C./min until reaching 800° C.; from 800° C. to 1200° C., the heating rate was adjusted to 80° C./min; and from 1200° C. to 1450° C., the heating rate was further reduced to 50° C./min; with an axial pressure of 30 MPa during the sintering process, and holding for 6 minutes after the temperature reaches 1400° C.

The ceramic material prepared in this example was cut into standard bar samples measuring 3 mm×4 mm×35 mm, which were then rough ground, fine ground, chamfered, and polished. The mechanical properties were tested, and the results showed that the material had a flexural strength of 530.30 MPa, a hardness of 18.35 GPa and a fracture toughness of 4.29 MPa·m1/2. The overall performance was relatively low.

Comparative Example 2

The sintering process of the self-healing ceramic material was adjusted in three stages of heating rates: the heating rate was set at 100° C./min until reaching 800° C.; from 800° C. to 1200° C., the heating rate was adjusted to 80° C./min; and from 1200° C. to 1475° C., the heating rate was further reduced to 50° C./min; with an axial pressure of 30 MPa during the sintering process, and holding for 6 minutes after the temperature reaches 1400° C.

The cross-sectional SEM image of the prepared $Al_2O_3$/TiN ceramic material was shown in FIG. 7. The grains are uniform without any abnormal growth, and there are few pores, indicating good sintering results.

The ceramic material prepared in this example was cut into standard bar samples measuring 3 mm×4 mm×35 mm, which were then rough ground, fine ground, chamfered, and polished. The mechanical properties were tested, and the results showed that the material had a flexural strength of 574.51 MPa, a hardness of 18.74 GPa and a fracture toughness of 4.51 MPa·m1/2. The overall performance was good. Using a Vickers hardness tester, a pre-crack was created on the smooth ceramic surface under a load of 196 N with a dwell time of 15 seconds.

The cracked samples were subjected to different heat treatments in a high-temperature air furnace. When the heat treatment temperature was 600° C. with a hold time of 60 minutes, the degree of crack repair was low. When the heat treatment temperature was 700° C. with a hold time of 60 minutes, the crack repair was more effective. When the heat treatment temperature was 800° C. with a hold time of 60 minutes, the cracks were almost completely repaired, but the surface porosity was high, as shown in FIG. 6.

Comparative Example 3

The sintering process of the self-healing ceramic material was adjusted in three stages of heating rates: the heating rate was set at 100° C./min until reaching 800° C.; from 800° C. to 1200° C., the heating rate was adjusted to 80° C./min; and from 1200° C. to 1500° C., the heating rate was further reduced to 50° C./min; with an axial pressure of 30 MPa during the sintering process, and holding for 6 minutes after the temperature reaches 1400° C.

The ceramic material prepared in this example was cut into standard bar samples measuring 3 mm×4 mm×35 mm, which were then rough ground, fine ground, chamfered, and polished. The mechanical properties were tested, and the results showed that the material had a flexural strength of 537.50 MPa, a hardness of 18.40 GPa and a fracture toughness of 4.37 MPa·m1/2. The overall performance was decreased.

The above descriptions are merely preferred embodiments of the present invention and are not intended to limit the present invention. For those skilled in the art, various changes and modifications can be made to the present invention. Any modification, equivalent replacement, or improvement made within the spirit and principles of the present invention should be included within the scope of the present invention's protection.

The invention claimed is:

1. A self-healing ceramic material with reduced porosity, comprising the following components by volume: 60-85 parts by volume of $Al_2O_3$, 10-20 parts by volume of TiN, 10-20 parts by volume of $TiSi_2$, 0.1-1 parts by volume of MgO, and 0.1-1 parts by volume of $Y_2O_3$.

2. The self-healing ceramic material according to claim 1, wherein comprising the following components by volume: 65-70 parts by volume of $Al_2O_3$, 15-20 parts by volume of TiN, 13-18 parts by volume of $TiSi_2$, 0.3-0.8 parts by volume of MgO, and 0.3-0.8 parts by volume of $Y_2O_3$.

3. The self-healing ceramic material according to claim 1, wherein comprising the following components by volume: 67-68 parts by volume of $Al_2O_3$, 16-17 parts by volume of TiN, 14-16 parts by volume of $TiSi_2$, 0.4-0.6 parts by volume of MgO, and 0.4-0.6 parts by volume of $Y_2O_3$.

4. The self-healing ceramic material according to claim 1, wherein comprising the following components by volume: 67.2 parts by volume of $Al_2O_3$, 16.8 parts by volume of TiN, 15 parts by volume of $TiSi_2$, 0.5 parts by volume of MgO, and 0.5 parts by volume of $Y_2O_3$.

5. The self-healing ceramic material according to claim 1, wherein an average particle size of $Al_2O_3$ powder is 0.5-1 μm, an average particle size of TiN powder is 0.5-1 μm, an average particle size of $Y_2O_3$ powder is 1-3 μm, and an average particle size of MgO powder is 0.4-0.7 μm.

6. A method for preparing the self-healing ceramic material according to claim 1, comprising:
    proportionally measuring $Al_2O_3$, TiN, and $TiSi_2$ powders and adding anhydrous ethanol and a dispersant to each component, ultrasonically dispersing the components to prepare individual suspensions of $Al_2O_3$, TiN, and $TiSi_2$, mixing the three suspensions to form a composite phase suspension; and
    proportionally adding MgO and $Y_2O_3$ powders to the composite phase suspension, ultrasonically dispersing, then ball milling in an inert atmosphere, followed by drying, sieving, pre-pressing, and sintering in a spark plasma sintering furnace.

7. The method according to claim 6, wherein the dispersant is polyethylene glycol 6000.

8. The method according to claim 6, wherein the ball milling is conducted for 40-50 hours.

9. The method according to claim 6, wherein the sintering uses the following heating program:
    maintaining a heating rate of 100° C./min when a temperature of sintering is below 800° C., controlling the heating rate to 80° C./min when the temperature of sintering is 800-1200° C., and reducing the heating rate to 50° C./min when the temperature of sintering is 1200-1400° C.; with an axial pressure of 30 MPa during the sintering process, and holding for 6 minutes after the temperature reaches 1400° C.

10. The method according to claim 6, wherein the sieving is performed using a 200 mesh screen.

* * * * *